United States Patent
Heuver (10) Patent No.: US 9,482,287 B2
(45) Date of Patent: Nov. 1, 2016

(54) PRESSURE PLATE STRESS-RELIEF GROOVES FOR A FRICTION ELEMENT ASSEMBLY IN A TRANSMISSION OF A MOTOR VEHICLE AND ASSOCIATED METHOD

(71) Applicant: Ford Global Technologies, LLC, Dearborn, MI (US)

(72) Inventor: Bradley Ronald Heuver, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 187 days.

(21) Appl. No.: 14/178,937

(22) Filed: Feb. 12, 2014

(65) Prior Publication Data

US 2015/0226272 A1   Aug. 13, 2015

(51) Int. Cl.
| | | |
|---|---|---|
| F16D 25/0638 | (2006.01) | |
| F16D 13/70 | (2006.01) | |
| F16D 55/40 | (2006.01) | |
| F16D 13/52 | (2006.01) | |
| F16D 13/64 | (2006.01) | |
| F16D 13/38 | (2006.01) | |
| F16D 13/68 | (2006.01) | |
| F16D 55/00 | (2006.01) | |

(52) U.S. Cl.
CPC ............ *F16D 13/646* (2013.01); *F16D 13/38* (2013.01); *F16D 13/52* (2013.01); *F16D 13/683* (2013.01); *F16D 55/00* (2013.01)

(58) Field of Classification Search
CPC ...... F16D 13/38; F16D 13/52; F16D 13/683; F16D 25/12; F16D 25/0638; F16D 55/40
USPC .......................................... 192/70.19, 85.24
See application file for complete search history.

(56) References Cited

U.S. PATENT DOCUMENTS

| | | | |
|---|---|---|---|
| 4,010,831 A | 3/1977 | Reuter | |
| 5,099,973 A * | 3/1992 | Flotow | F16D 13/50 |
| | | | 192/107 R |
| 5,416,966 A | 5/1995 | Boerger et al. | |
| 5,893,445 A | 4/1999 | Dover | |
| 5,913,397 A * | 6/1999 | Okada | F16D 25/0638 |
| | | | 192/48.601 |
| 6,892,869 B2 | 5/2005 | Ookita et al. | |
| 7,237,664 B2 | 7/2007 | Sugita et al. | |
| 7,438,168 B2 | 10/2008 | Kita et al. | |
| 8,091,873 B2 | 1/2012 | Ogawa et al. | |
| 8,109,377 B2 | 2/2012 | Mizuno et al. | |
| 2005/0263367 A1 | 12/2005 | Kita et al. | |

FOREIGN PATENT DOCUMENTS

| | | | | |
|---|---|---|---|---|
| EP | 2775158 A1 * | 10/2014 | ............. | F16D 13/70 |
| WO | 2013/065559 | 5/2013 | | |

\* cited by examiner

*Primary Examiner* — Jacob S Scott
*Assistant Examiner* — Tinh Dang
(74) *Attorney, Agent, or Firm* — Diederiks & Whitelaw, PLC (57) ABSTRACT

Stress-relief grooves are provided in a pressure plate of a friction element assembly in a motor vehicle comprising a transmission. The friction element assembly includes a piston assembly provided for applying a force to a set of plates and friction members to cause torque to be transmitted through the friction element assembly. A pressure plate is supported by the housing and held in place by a snap ring mounted in a mounting groove. The pressure plate includes a first side facing the set of plates and friction members and a second side having at least one stress-relief groove configured to reduce stress in the housing at the mounting groove.

19 Claims, 8 Drawing Sheets

| | Brk A | Brk B | Clt C | Clt D | Clt E | Clt F | OWC |
|---|---|---|---|---|---|---|---|
| 1st | X | X | | (O) | X | | X |
| 2nd | X | X | X | X | | | X |
| 3rd | X | | X | X | X | | |
| 4th | X | | X | X | | X | |
| 5th | X | | X | | X | X | |
| 6th | X | | | X | X | X | |
| 7th | | | X | X | X | X | |
| 8th | | X | | X | X | X | |
| 9th | | X | X | | X | X | |
| 10th | | X | X | X | | X | |
| Rev | X | X | | X | | X | |

PRESSURE PLATE STRESS-RELIEF GROOVES FOR A FRICTION ELEMENT ASSEMBLY IN A TRANSMISSION OF A MOTOR VEHICLE AND ASSOCIATED METHOD

BACKGROUND OF THE INVENTION

The present invention pertains to the art of friction element assemblies, such as clutches and brakes, for automatic transmissions of motor vehicles and, more particularly, to reducing stress in parts of a friction element assembly by providing stress-relief grooves in a pressure plate located in the friction element assembly.

An automatic transmission of a vehicle generally includes an input shaft and an output shaft. The input shaft receives an input torque from a power source, such as an internal combustion engine or an electric motor. The transmission then converts the input torque to an output torque. The output shaft transmits the output torque to the wheels of the vehicle in order to propel the vehicle. The transmission converts the input torque to the output torque by adjusting a gear ratio (for example, during an upshift or a downshift) between the input shaft and the output shaft. This adjustment is accomplished by applying or releasing friction element assemblies, such as clutches or brakes, in order to change torque relationships by altering planetary gear configurations of the transmission.

In a typical transmission for a motor vehicle, the friction element assemblies include multiple interleaved plates and friction members. During operation of the vehicle, in order to apply a friction element assembly, a piston assembly contacts and then applies a force to compress the plates and friction members together to transmit torque through the friction element assembly. For this compression to occur, movement of the plates and friction members must be restricted in some way to provide a force opposing the force applied by the piston assembly. Generally, a pressure plate retained by a snap ring is provided for this purpose, although other portions of the transmission are sometimes used when allowed by the structure of the transmission.

During assembly of the transmission, the friction element assembly is installed followed by the snap ring. The snap ring is usually retained in a mounting groove located in a housing of the friction element assembly and keeps the pressure plate from moving. When the friction element assembly is actuated, the piston assembly compresses the interleaved plates and friction members against the pressure plate. The pressure plate also applies a force to the snap ring, which in turn applies a force to the housing at the mounting groove. As a result, a significant level of stress is applied to the housing, potentially causing the housing to be damaged. Based on the above, there exists a need in the art for a way to ensure the stress level in the housing is kept low so as not to damage the housing.

SUMMARY OF THE INVENTION

The present invention is directed to reducing stress in a housing of a friction element assembly by providing stress-relief grooves in a pressure plate of the friction element assembly. More specifically, in a motor vehicle comprising a transmission there is a friction element assembly that has a housing formed with a mounting groove. The friction element assembly is preferably a clutch or a brake. A snap ring is positioned in the mounting groove. The housing supports a set of plates and friction members. A piston assembly is provided for applying a force to the set of plates and friction members to cause torque to be transmitted through the friction element assembly. A pressure plate is supported by the housing and held in place by the snap ring. The pressure plate includes a first side facing the set of plates and friction members. The pressure plate also includes a second side having at least one cut-out region facing the snap ring. The at least one cut-out region constitutes a stress-relief groove and is configured to reduce stress in the housing at the mounting groove.

Preferably, the pressure plate includes an inner annular hub, an outer annular ring, and at least two radially extending spokes extending from the inner annular hub to the outer annular ring and collectively defining at least one aperture. The friction assembly housing includes at least one leg passing through the at least one aperture and the mounting groove is located in the at least one leg. Preferably, the housing includes a series of legs arranged in a circular configuration and the mounting groove extends in a circle through most of the series of legs. The cut-out region is located on the at least two radially extending spokes.

In another preferred embodiment, the snap ring includes a first end as well as a second end spaced from the first end. One spoke of the at least two radially extending spokes extends between the first end and the second end of the snap ring. Such an arrangement prevents the snap ring from rotating relative to the pressure plate. The cut-out region is preferably located in the inner annular hub and is configured to prevent the force applied to the set of plates and friction members from loading the housing near the mounting groove. In one embodiment, the cut-out region is between 0.1 and 0.4 mm deep, more preferably between 0.15 and 0.35 mm deep, and is configured to lower the stress in the housing by at least 13-15%. Applying a force to the set of plates and friction members with the piston assembly initially causes the stress in the housing near the mounting groove. The stress is reduced by preventing the force from loading the housing near the mounting groove by forming the cut-out region or stress-relief groove in the pressure plate.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
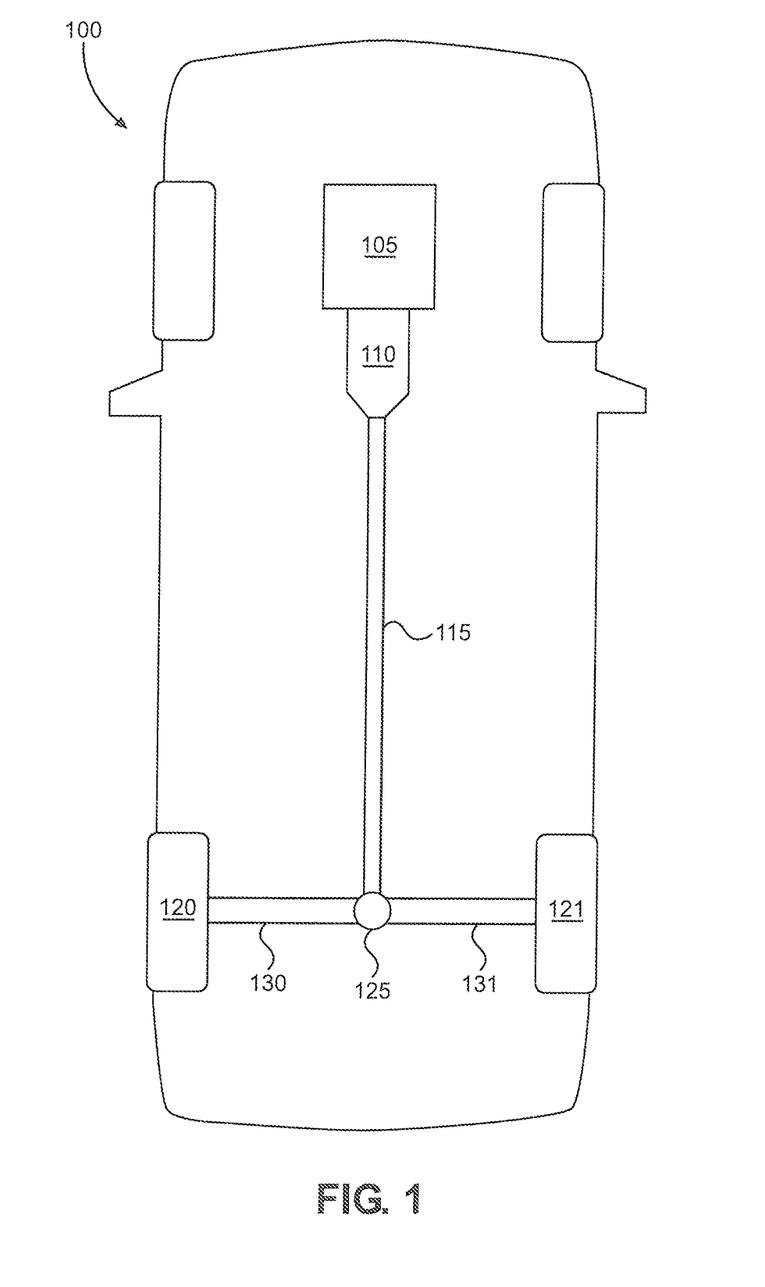
FIG. 1 is a schematic view of a vehicle driveline in accordance with the present invention.

With initial reference to FIG. 1, there is shown a motor vehicle 100 in accordance with the present invention. Vehicle 100 has a power source 105, such as an internal combustion engine or an electric motor, connected to a transmission 110. Power is transmitted from power source 105 to transmission 110 and then to a driveshaft 115, which transmits the power to rear wheels 120, 121 through a differential assembly 125 and half shafts 130, 131. In such a configuration, vehicle 100 is a rear-wheel drive vehicle. However, additional configurations are usable in connection with the present invention. For example, in other embodiments, vehicle 100 is front-, four- or all-wheel drive. In the four- and all-wheel drive embodiments, vehicle 100 would also include a transfer case, a second driveshaft, a second differential assembly and two more half shafts (not shown). Additionally, power source 105 does not need to be located in a front portion of vehicle 100, but can instead by located elsewhere, as in a rear- or a mid-engine embodiment.

Figure 2A:
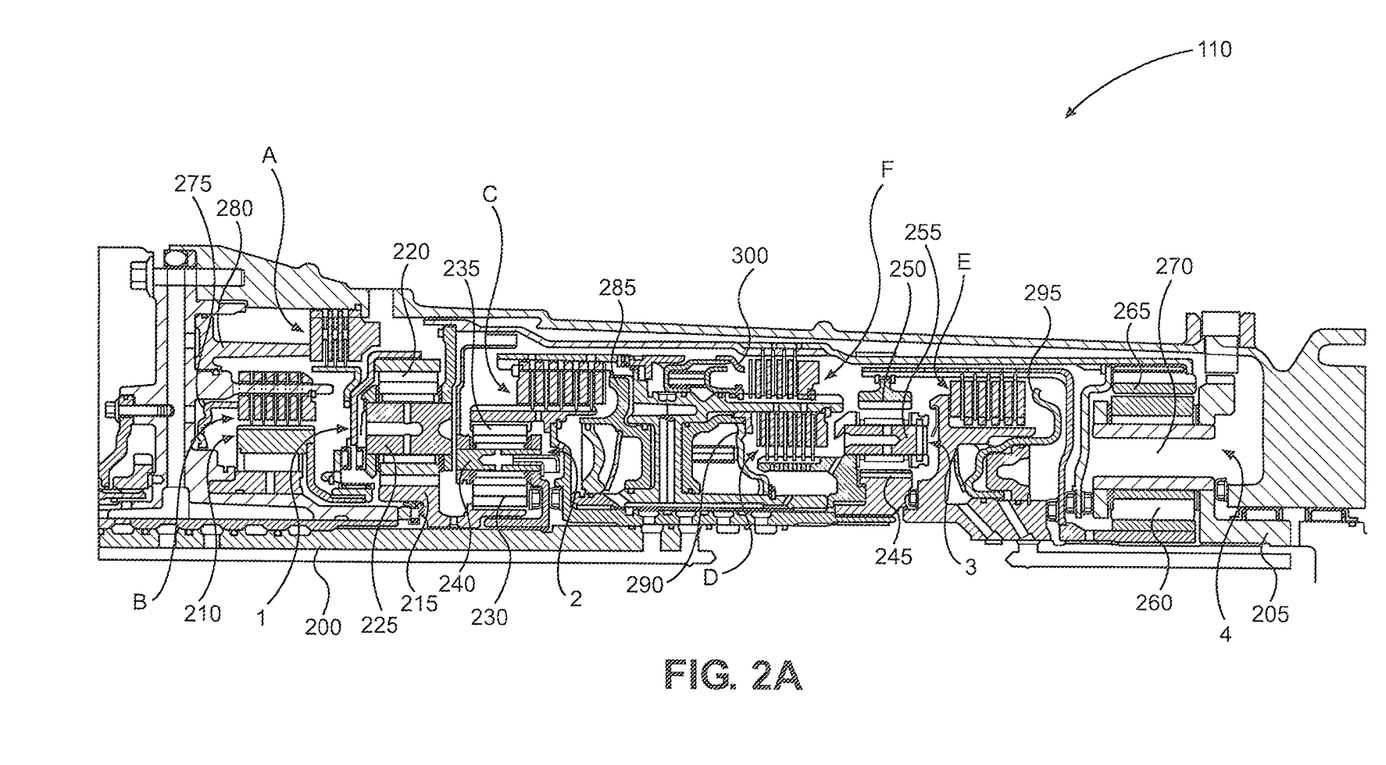
FIG. 2A is cross-sectional view of a transmission in accordance with the invention.
Figure 2B:
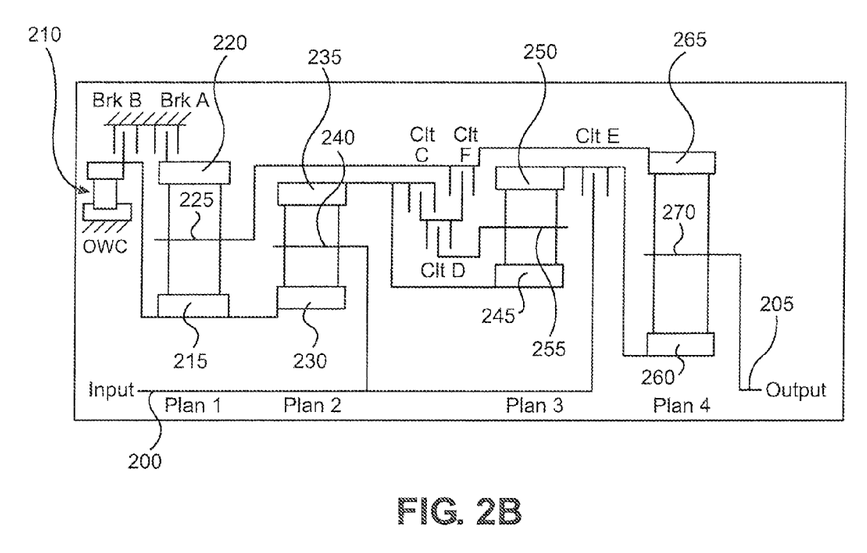
FIG. 2B is a schematic view of the transmission of FIG. 2A.

Referring now to FIGS. 2A and 2B, transmission 110 is shown in greater detail. In this embodiment, transmission 110 is a ten-speed transmission (i.e., it has ten different forward gear ratios) although the present invention is not limited to use with such a transmission. Transmission 110 includes an input 200, an output 205, a one-way clutch 210, a brake A, a brake B, a clutch C, a clutch D, a clutch E, a clutch F, four sets of gears and a piston assembly for each of brakes A and B and clutches C, D, E and F. The four sets of gears each have a sun gear, a ring gear and at least one planetary gear, which together define a planetary gear set. In particular, FIG. 2A shows a first sun gear 215, a first ring gear 220 and a first planetary gear 225 defining a planetary gear set 1; a second sun gear 230, a second ring gear 235 and a second planetary gear 240 defining a planetary gear set 2; a third sun gear 245, a third ring gear 250 and a third planetary gear 255 defining a planetary gear set 3; and a fourth sun gear 260, a fourth ring gear 265 and a fourth planetary gear 270 defining a planetary gear set 4. Piston assemblies 275 and 280 are associated with brakes A and B, respectively, while piston assemblies 285, 290, 295 and 300 are associated with clutches C, D, E, and F, respectively.

Figure 2C:
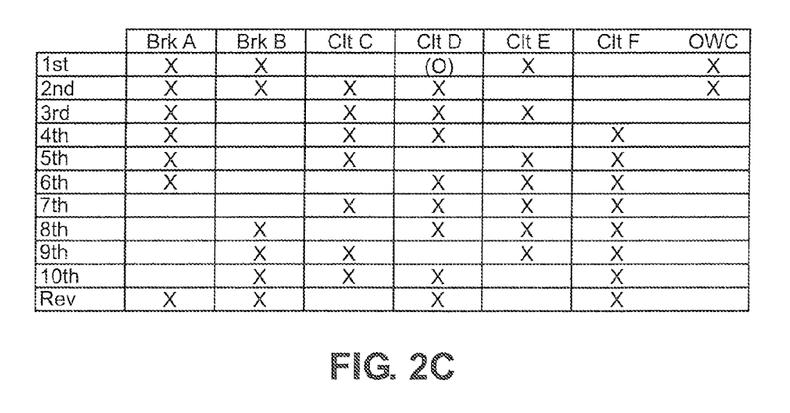
FIG. 2C is a chart showing the friction element assembly application schedule for the transmission illustrated in FIG. 1.

In general, transmission 110 converts an input torque coming from power source 105 to an output torque going to rear wheels 120, 121 by adjusting a gear ratio (for example, during an upshift or a downshift) between input 200 and output 205. This adjustment is accomplished by applying or releasing friction element assemblies (i.e., one-way clutch 210, brakes A and B and clutches C, D, E and F) in order to change torque relationships by altering gear configurations of transmission 110. As a result, power flow paths are established and disestablished from power source 105 to rear wheels 120, 121. This is more clearly shown in connection with FIG. 2B, which is a schematic view of transmission 110, and FIG. 2C, which is a chart showing a friction element assembly application schedule indicating which friction element assemblies are active in each gear.

Figure 3:
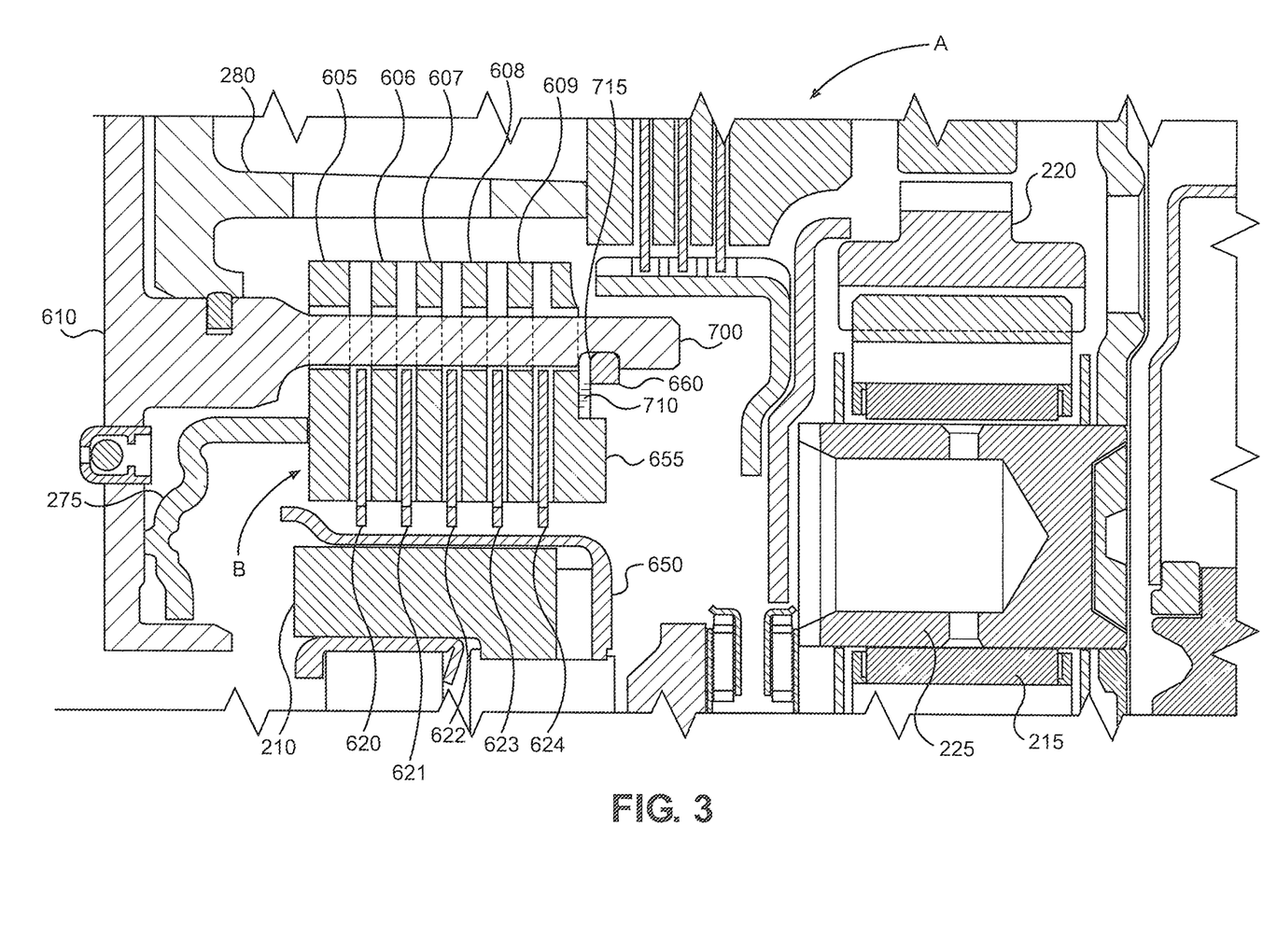
FIG. 3 is a partial cross-sectional view of FIG. 1 showing one of the friction element assemblies of FIG. 1 in detail.

With reference now to FIG. 3, a portion of transmission 110 near brake B is shown. Piston assembly 275 is mounted in a stationary brake housing 610. Brake B includes plates 605, 606, 607, 608, and 609 coupled to brake housing 610 through a spline connection and friction members 620, 621, 622, 623 and 624 coupled to a clutch drum 650 through another spline connection and interleaved with plates 605, 606, 607, 608, and 609. To apply brake B, piston assembly 275 is caused to move to the right with respect to FIG. 3. As piston assembly 275 moves to the right, it will contact plate 605, which will contact friction member 620 and eventually apply pressure to all the interleaved friction members 620, 621, 622, 623 and 624 and plates 605, 606, 607, 608 and 609. The rightward movement of plates 605, 606, 607, 608 and 609 and friction members 620, 621, 622, 623 and 624 is halted by a pressure plate 655, which is held in place with a snap ring 660. At this point, friction created between plates 605, 606, 607, 608 and 609 and friction members 620, 621, 622, 623 and 624 causes brake drum 650 to stop rotating.

The pressure applied by piston assembly 275 to plates 605, 606, 607, 608 and 609 and friction members 620, 621, 622, 623 and 624 is also applied, in turn, to snap ring 660 and legs of brake housing 610, one of which is labeled 700. In order to reduce the stress caused by this pressure, a cut-out region or stress-relief groove 710 is formed in pressure plate 655 near snap ring 660, In other brake or clutch arrangements, however, it is not necessarily beneficial to include cut-out regions. For example, with brief reference to FIG. 2A, it can be seen that none of brake A or clutches C, D, E or F has a housing running therethrough. Instead the housings are located at inner or outer peripheries of brake A and clutches C, D, E and F. As transmissions designs become increasingly complex, it is not always possible to arrange friction element assemblies in such a manner. In particular, and with reference to FIG. 3 once again, having brake housing 610 run through brake B means that brake housing 610 is divided into legs, such as leg 700. This makes brake housing 610 less strong as compared with housings for brake A and clutches C, D, F and F, which form unbroken circles. In situations where size constraints, for example, suggest having a housing formed as a broken circle, it has been found to be beneficial to provide stress reduction depending on the amount of stress exerted on the housing.

Figure 4:
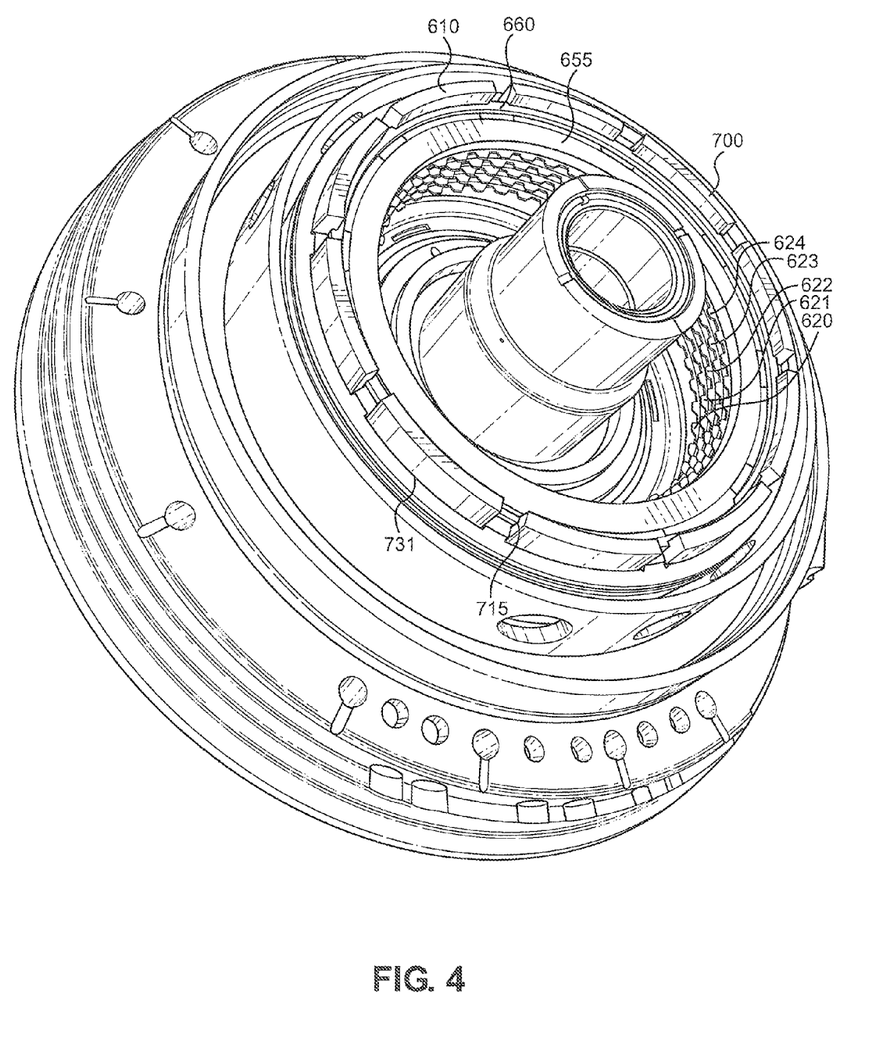
FIG. 4 is a perspective view of a friction element assembly housing for the fiction element assembly illustrated in FIG. 3.

The structure of brake B is more easily seen in connection with FIG. 4, which is a perspective view of brake housing 610 showing the placement of friction members 620, 621, 622, 623 and 624. Brake housing 610 is shown without brake drum 650 for clarity. FIG. 4 shows how brake housing 610 is provided with various circumferentially-spaced legs, one of which is labeled 700, that pass through respective apertures in pressure plate 655, one of which is labeled 731. Snap ring 660 is shown mounted in mounting groove 715 formed in housing 610. Mounting groove 715 follows brake housing 610 to form a circular shape on an inner periphery of brake housing 610. Since brake housing 610 is formed of legs, brake housing 610 is not as strong as an unbroken circular housing would be. As mentioned above, stress concentrations will occur in brake housing 610 at mounting groove 715 during operation of brake B.

Figure 5:
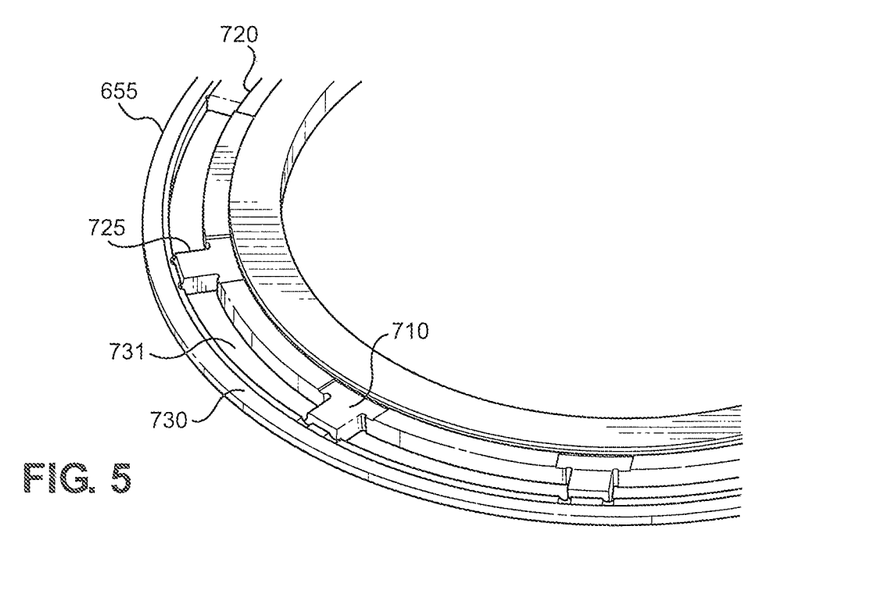
FIG. 5 is a perspective view of a pressure plate for the friction element assembly illustrated in FIG. 3 showing stress-relief grooves.

FIG. 5 shows a close-in view of a portion of pressure plate 655 showing cut-out region or stress-relief groove 710 formed in pressure plate 655. Pressure plate 655 includes an inner annular hub 720 and an outer annular ring 730 connected to inner annular hub 720 by radially extending spokes 725. Adjacent spokes 725 define a respective one of the at least one aperture 731. Applying a force to plates 605, 606, 607, 608 and 609 and friction members 620, 621, 622, 623 and 624 with piston assembly 275 initially causes stress in brake housing 610 near mounting groove 715. Cut-out region 710 is configured to prevent the force applied to plates 605, 606, 607, 608 and 609 and friction members 620, 621, 622, 623 and 624 from loading brake housing 610 near mounting groove 715. In one embodiment, cut-out region 710 is between 0.1 and 0.4 mm deep, more preferably between 0.15 and 0.35 mm deep, most preferably 0.25 mm deep, and is configured to lower the stress in brake housing 610 by at least 13-15% compared with a similar pressure plate including apertures and formed without such regions. The stress is reduced by preventing the force from loading brake housing 610 near mounting groove 715 by forming cut-out region 710 or stress-relief groove in pressure plate 655.

Figure 6:
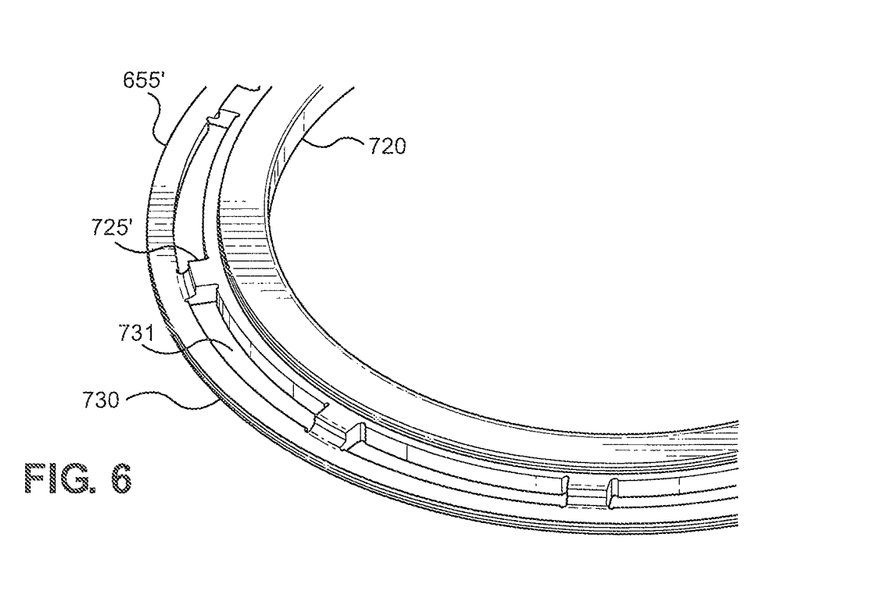
FIG. 6 is a perspective view of an unmodified pressure plate for the friction element assembly illustrated in FIG. 3.
Figure 7:
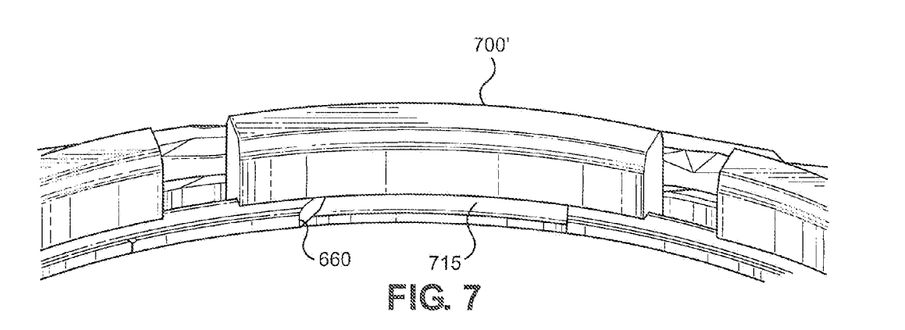
FIG. 7 is a perspective view of a pressure plate and a snap ring wherein the pressure plate has an increased thickness.
Figure 8:
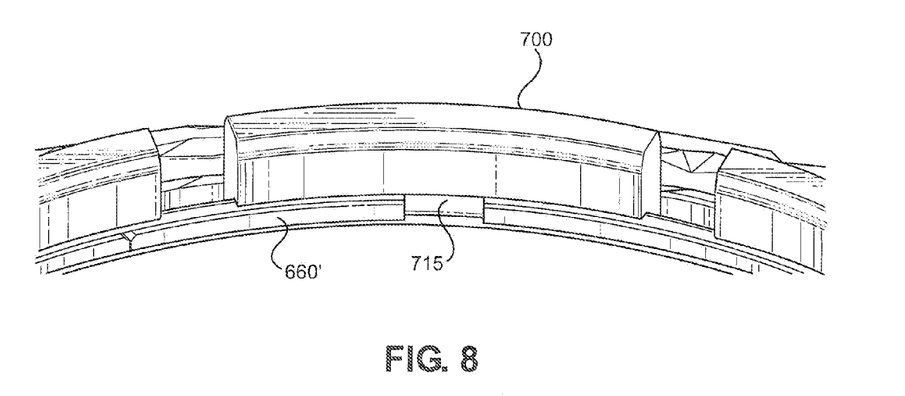
FIG. 8 is a perspective view of a pressure plate and snap ring wherein the snap ring has a reduced gap between ends of the snap ring.

Although cut-out region 710 represents a preferred way to reduce stress applied to brake housing 610, in other clutch or brake arrangements, less stress is exerted on a housing and so less stress reduction is provided. Accordingly, other pressure plate configurations are shown in FIGS. 6-8 for use with such arrangements. Specifically, FIG. 6 shows a pressure plate 655' without cut-out region 710, but with aperture 731. Accordingly, pressure plate 655' is preferably used in a situation where less stress is applied to a brake housing, but the brake housing is still formed from multiple circumferentially-spaced legs due to packaging constraints. Similarly, FIG. 7 shows a leg 700' that extends further beyond mounting groove 715 than leg 700 (i.e., leg 700' is thicker), while FIG. 8 shows a snap ring 660' with a smaller gap between its ends with a distance between a first end and a second end being shorter than one third of a distance extending along mounting groove 715 in one of the at least one leg 700. Although the configurations shown in FIGS. 7 and 8 do not reduce stress as effectively as the embodiment shown in FIGS. 1-5, such configurations are useful in lower stress environments.

Figure 9:
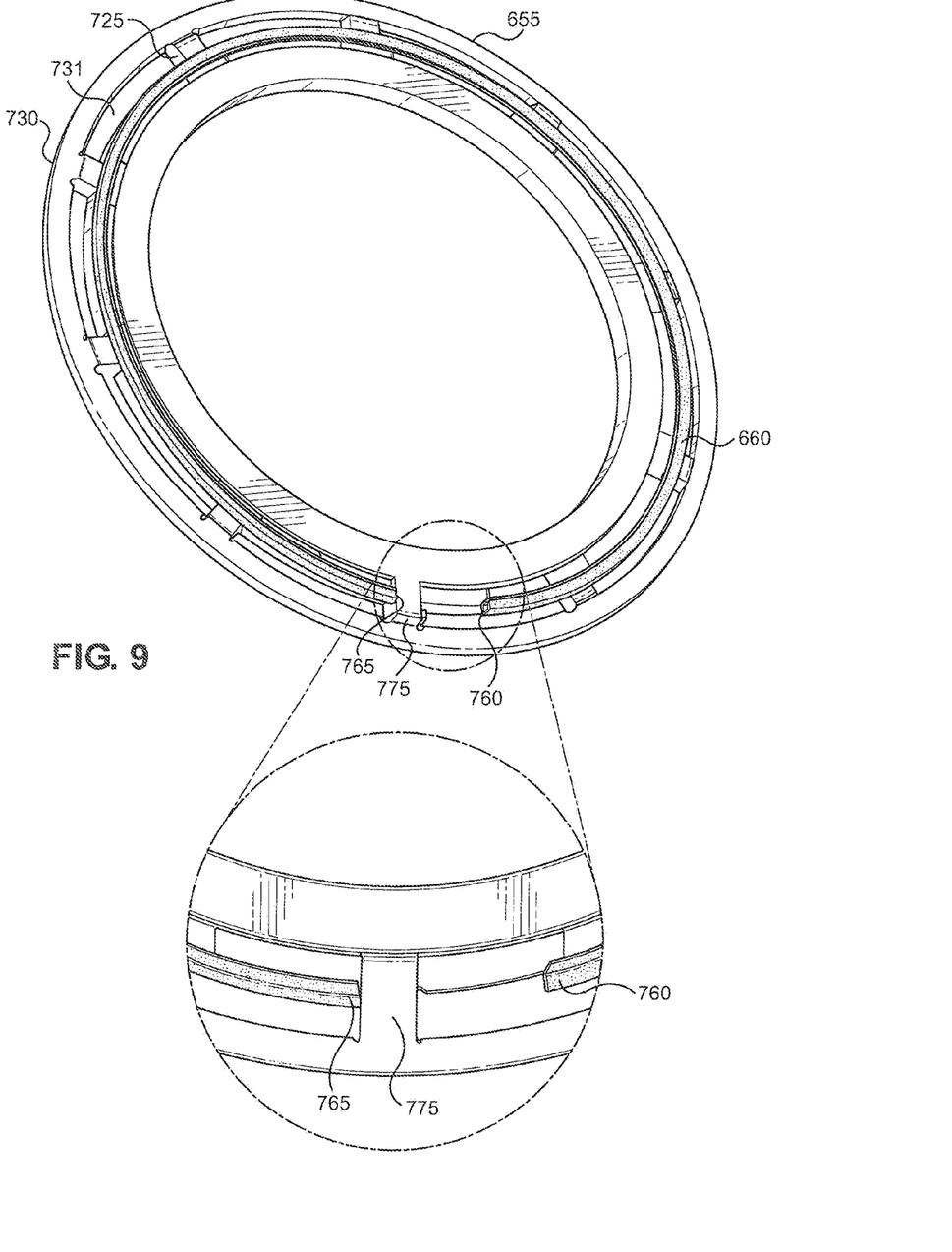
FIG. 9 is a perspective view of the pressure plate in FIG. 5 showing a snap ring mounted thereon.

FIG. 9 shows pressure plate 655 and snap ring 660 in an assembled state. In this embodiment, snap ring 660 includes a first end 760 and a second end 765 spaced from first end 760. A radially extending spoke 775 without a cut-out region extends between first end 760 and second end 765 to prevent snap ring 660 from rotating relative to pressure plate 655.

Based on the above, it should be readily apparent that the present invention provides a transmission design that provides stress-relief grooves on a pressure plate to reduce the amount of stress occurring in a brake housing. Although described with reference to preferred embodiments, it should be readily understood that various changes or modifications could be made to the invention without departing from the spirit thereof. For example, the present invention is usable with both clutches and brakes, as well as a wide range of transmissions. In general, the invention is only intended to be limited by the scope of the following claims.

The invention claimed is:

1. An automatic transmission including a friction element assembly, said friction element assembly comprising:
a housing with a mounting groove;
a snap ring positioned in the mounting groove;
a set of plates and friction members supported by the housing;
a piston assembly for applying a force to the set of plates and friction members to cause torque to be transmitted through the friction element assembly; and
a pressure plate supported by the housing and held in place by the snap ring, said pressure plate including a first side facing the set of plates and friction members and a second side having at least one cut-out region facing the snap ring, said at least one cut-out region configured to reduce stress on the housing at the mounting groove.

2. The automatic transmission according to claim 1, wherein the friction element assembly is a brake.

3. The automatic transmission according to claim 1, wherein:
the pressure plate further includes an inner annular hub, an outer annular ring, and at least two radially extending spokes collectively defining at least one aperture;
the housing further includes at least one leg passing through the at least one aperture;
said mounting groove is located in the at least one leg; and
said at least one cut-out region is located on the at least two radially extending spokes.

4. The automatic transmission according to claim 3 wherein:
the snap ring includes a first end and a second end spaced from the first end;
one of the at least two radially extending spokes extends between the first end and the second end of the snap ring and prevents the snap ring from rotating relative to the pressure plate; and
said at least one cut-out region is located in the inner annular hub.

5. The automatic transmission according to claim 1 wherein the cut-out region is a stress-relief groove that is between 0.1 and 0.4 mm deep.

6. The automatic transmission according to claim 5, wherein the stress-relief groove is between 0.15 and 0.35 mm deep and configured to lower the stress by at least 13%.

7. An automatic transmission including a friction element assembly, said friction element assembly comprising:
a housing including at least one leg with a mounting groove;
a snap ring positioned in the mounting groove;
a set of plates and friction members supported by the housing;
a piston assembly for applying a force to the set of plates and friction members to cause torque to be transmitted through the friction element assembly; and
a pressure plate including an inner annular hub, an outer annular ring, and at least two radially extending spokes collectively defining at least one aperture between the inner annular hub and outer annular ring, wherein the at least one leg passes through the at least one aperture to support the pressure plate and the snap ring retains the pressure plate on the housing.

8. The automatic transmission according to claim 7, wherein said pressure plate includes a first side facing the set of plates and friction members and a second side having at least one cut-out region formed therein and facing the snap ring, said at least one cut-out region being configured to reduce stress in the housing at the mounting groove.

9. The automatic transmission according to claim 8 wherein the at least one cut-out region is located on the at least two radially extending spokes.

10. The automatic transmission according to claim 8 wherein:
the snap ring includes a first end and a second end spaced from the first end;
one of the at least two radially extending spokes extends between the first end and the second end of the snap ring and prevents the snap ring from rotating relative to the pressure plate; and
said at least one cut-out region is located in the inner annular hub.

11. The automatic transmission according to claim 8, wherein the cut-out region is further configured to prevent the force applied to the set of plates and friction members from loading the housing near the mounting groove.

12. The automatic transmission according to claim 9, wherein the cut-out region is a stress-relief groove that is between 0.1 and 0.4 mm deep.

13. The automatic transmission according to claim 12, wherein the stress-relief groove is between 0.15 and 0.35 mm deep and configured to lower the stress in the housing by at least 13%.

14. The automatic transmission according to claim 7, wherein said at least one leg extends beyond the mounting groove to strengthen the housing.

15. The automatic transmission according to claim 7 wherein the snap ring is circular and includes a first end and a second end, with a distance between the first end and the second end being shorter than one third of a distance extending along the mounting groove in one of the at least one leg and wherein the at least one leg extends through the plates but not the friction members.

16. A method for reducing stress in a friction element assembly of an automatic transmission, said friction element assembly including a housing with a mounting groove, a snap ring positioned in the mounting groove, a set of plates and friction members supported by the housing, a piston assembly, and a pressure plate supported by the housing and held in place by the snap ring, said pressure plate including a first side facing the set of plates and friction members and a second side, said method comprising:
applying a force to the set of plates and friction members with the piston assembly; and
reducing stress on the housing at the mounting groove caused by the force by forming a cut-out region in the pressure plate.

17. The method according to claim 16, further comprising preventing the snap ring from rotating relative to the pressure plate.

18. The method according to claim 16, further comprising lowering the stress in the housing by at least 13%.

19. The method according to claim 16, further comprising lowering the stress in the housing by at least 15%.

* * * * *